Dec. 11, 1923.  1,477,477

O. R. DUNNET

MOTOR VEHICLE SUSPENSION

Filed Sept. 6, 1921

INVENTOR
ORVILLE RANDOLPH DUNNET
BY
ATTORNEYS

Patented Dec. 11, 1923.

1,477,477

UNITED STATES PATENT OFFICE.

ORVILLE RANDOLPH DUNNET, OF CHARRA, WEST COAST, SOUTH AUSTRALIA, AUSTRALIA.

MOTOR-VEHICLE SUSPENSION.

Application filed September 6, 1921. Serial No. 498,651.

*To all whom it may concern:*

Be it known that I, ORVILLE RANDOLPH DUNNET, a subject of the King of Great Britain and Ireland, residing at Charra, West Coast, State of South Australia, Commonwealth of Australia, have invented certain new and useful Improvements in Motor-Vehicle Suspensions, of which the following is a specification.

My invention comprises an improved method of and means for mounting or attaching the half-elliptic springs usually employed in motor vehicle suspension.

Heretofore the half-elliptic spring (hereinafter called the main spring) has been fastened at its centre directly to the frame of the vehicle, the inner end of the spring being connected to the frame by a link and the outer end being attached to the axle or to the axle housing either through a link or directly, hence these springs are commonly known as cantilever springs.

In vehicles employing the ordinary double-armed or semi-elliptical springs the ends of which are connected to the vehicle frame, it has been proposed to employ a single-armed spring one end of which has been secured to the center of the semi-elliptical spring, and the other end to the axle of the wheel.

According to my invention, instead of the rigid fastening to the vehicle frame, I interpose between the frame and the main spring, a specially shaped supplementary quarter-elliptic spring, the outer or butt end of which is rigidly fastened to the frame of the vehicle either directly or by means of a sub-frame or a suitable bracket and the inner end rests upon and is connected to the main spring at or near the centre thereof.

The object of my invention is to provide a spring suspension composed of a half-elliptic main spring and a quarter-elliptic supplementary spring so arranged or combined that, when the spring is subjected to severe strain or excessive weight, the main spring is stiffened by the movement outward towards the axle of its point of contact with the supplementary spring, thereby reducing the effective leverage of the axle over the spring, and thereby greatly reducing the possibility of the spring being strained by over-loading or when severe stress is put upon it. This permits of the use of a lighter spring adapted to carry the normal load and which, when thus automatically shortened, will have sufficient strength to take the abnormal strain or heavier load.

This object I attain by attaching the outer or butt end of the quarter-elliptic supplementary spring to the vehicle frame approximately over the axle while its inner end rests upon the half-elliptic main spring at about the centre of same, such inner end being formed with a reverse curve so that the under face of the said supplementary spring forms an acute angle with the upper face of the main spring. It will be apparent from the drawing that when abnormal strain or excessive load is applied and the springs are flattened the point of contact between the top face of the main spring and the bottom face of the supplementary spring moves outward toward the butt end of the supplementary spring and towards the axle, and so shortens the effective portion both of the main spring and of the supplementary spring.

In order that my invention and the manner of its operation may be more readily understood and carried into effect I will describe the same with reference to the accompanying drawings in which—

Figure 1:
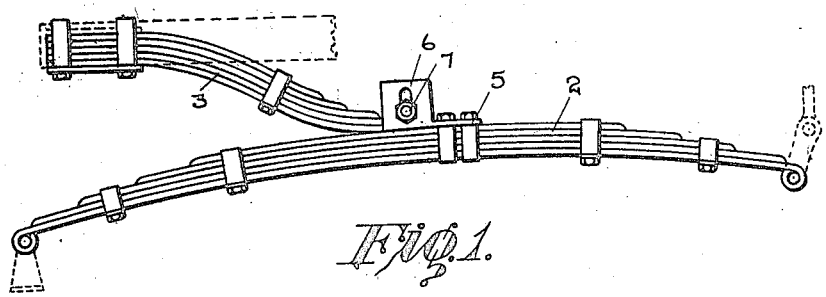
Fig. 1 is a side view showing the main spring and the supplementary spring.
Figure 3:
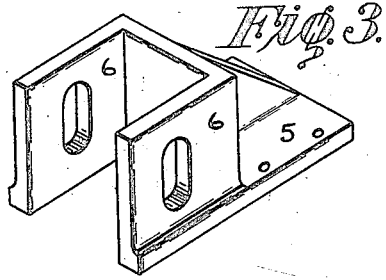
Fig. 3 is a perspective view of the bracket connection alone.
Figure 2:
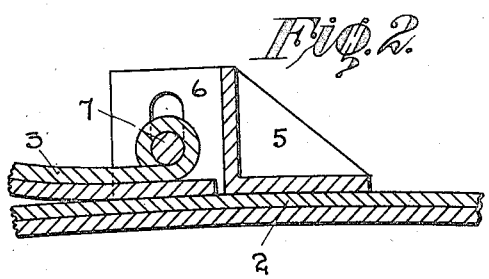
Fig. 2 is a sectional view of the bracket connection whereby the end of the supplementary spring is connected to the main spring.

In the drawings 2 represents the main spring and 3 my supplementary spring.

The butt end of the supplementary spring, that at which the leaves are bolted or clamped together, is clamped or otherwise rigidly fastened to the frame of the vehicle and its other end is connected to the main spring.

In some vehicles the frame is so shaped that the butt end of my supplementary spring may be attached directly thereto, but in other vehicles the frame must be modified, for instance by the provision of a subframe or extension bars to take the butt end of the supplementary spring.

The other end of the supplementary spring 3 rests upon and is connected to the convex back of the main spring 2, the connection being such as to permit of a slight vertical movement of the ends of the leaves of the spring 3 but preventing any endwise movement of those leaves upon the main spring 2.

The connection which I show in the drawings and prefer comprises a bracket 5 rigidly fastened to main spring 2 and having two upwardly extending vertically slotted ears 6, one upon each side of the end of the spring 3, in combination with a cross pin 7 carried in an eye formed in the end of the uppermost full length leaf of the spring 3, the projecting ends of the cross pin 7 fitting into the slots in the said ears 6 so that the ends of the leaves and the pin are capable of slight vertical movement but are held against any endwise movement upon the back of the main spring.

The main spring 2 is arranged with its convex face uppermost and its two ends are connected as heretofore to the vehicle frame and to the axle or to the axle housing respectively, in some cases directly and in some cases by interposed links.

The upper shorter leaves of the supplementary spring 3 may have a simple downward curve only but the lower longer leaves have a second or reverse curve so that when the two springs are assembled and secured in position a V shaped space (with an acute angle) is formed between the under face of such leaves and the convex back of the main spring.

The effect of this construction is that normally the weight of the vehicle is applied through my supplementary spring 3 to approximately the centre of the main spring 2 and so to the axle, but when an excessive load is applied or when a severe rise of the wheel the springs are deflected and the point of contact (which is the point of support) between the back of the main spring 2 and the face of the supplementary spring 3 moves outward towards the butt end of supplementary spring and the axle shortening the effective length of both springs and thereby stiffening the spring and shortening the relative leverage of the axle.

Figure 4:
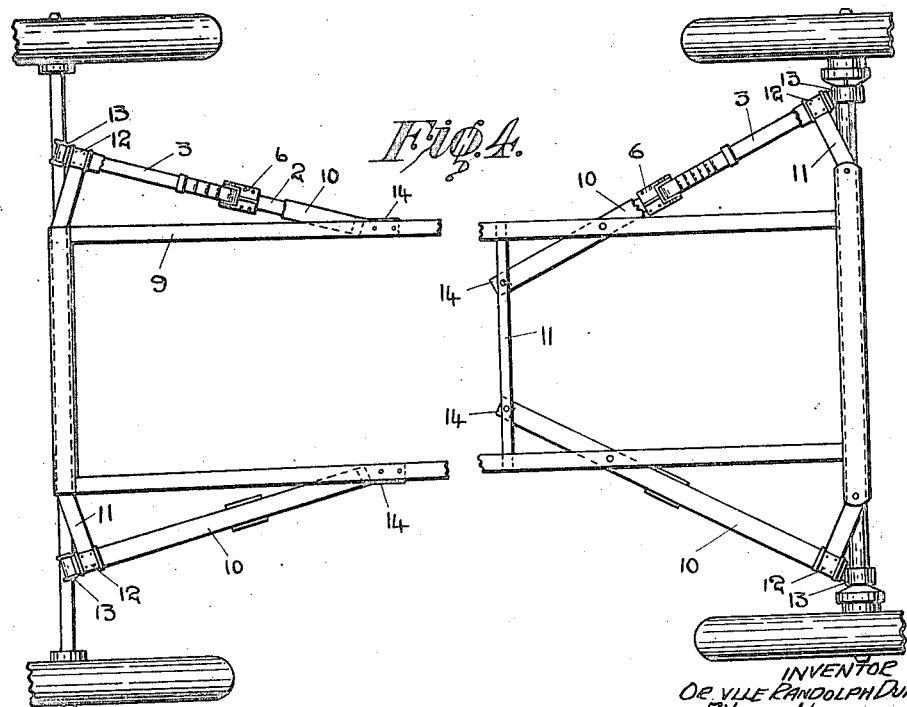
Fig. 4 is a diagrammatic plan of one type of frame showing my invention applied thereto.

In Fig. 4 is shown diagrammatically a vahicle frame 9 to which a subframe has been attached for the purpose of affixing my invention. Such subframe comprises four diverging bars 10 fastened to the original frame and to three transverse bars 11, also fastened to the original frame. The butt ends of my supplementary springs 3 are fastened to the bars 10 at the points 12, the outer ends of the springs 2 being attached to the axle or axle housing at 13 and the inner ends to the subframe at 14.

In some makes of vehicles not provided with radius rods connecting the underside of the axle or of the axle housing to the frame of the vehicle it will be necessary to provide such rods to keep the axle in alignment.

What I claim is:—

1. In a motor vehicle spring suspension the combination with a half-elliptic main spring arranged with its convex face uppermost its outer and inner ends being connected to the axle and to the frame respectively, of a specially shaped quarter elliptic supplementary spring rigidly fastened at its outer and butt end to the vehicle frame approximately over the axle and having its inner and free end resting directly upon the main spring approximately at the centre thereof such free end having a reverse curve whereby when severe strain is placed upon the springs and the springs are flattened the point of contact between the springs moves nearer to the butt end of the supplementary spring and to the axle.

2. A motor vehicle spring suspension comprising:—a half-elliptic main spring arranged with its convex face uppermost, its outer end being connected to the axle and its inner end to the vehicle frame; a quarter-elliptic supplementary spring arranged vertically above the main spring and with its convex face uppermost, its outer and butt end being rigidly fastened to the vehicle frame approximately over the axle and its inner and free end being supported by the main spring at about the centre thereof, its free end being reversely curved and resting directly upon the back of the main spring approximately at the center thereof and forming an acute angle therewith, whereby when a severe strain is placed upon the springs and the springs are flattened the point of contact between the springs moves nearer to the butt end of the supplementary spring and to the axle; and means for connecting the free end of the supplementary spring to the main spring said means permitting vertical movement and preventing endwise movement of the end of the supplementary spring relatively to the main spring.

3. A motor vehicle spring suspension, comprising a half-elliptical main spring arranged with its convex face uppermost and having its ends connected to the axle and vehicle frame, a bracket secured to the upper face of the main spring at the center thereof and having spaced ears provided with vertical slots, and a quarter-elliptical supplementary spring having its butt end secured to the vehicle frame, the other end of the said spring being reversely curved and resting directly upon the main spring between the ears of the bracket, said end being provided with a transverse pin extending into the slots of said ears.

In testimony that I claim the foregoing as my invention I have signed my name in the presence of two subscribing witnesses this 21st day of July, 1921.

ORVILLE RANDOLPH DUNNET.

Witnesses:
ARTHUR GORE COLLISON,
KATHLEEN MARY COLLISON.